(12) United States Patent
Guan et al.

(10) Patent No.: US 10,270,577 B2
(45) Date of Patent: Apr. 23, 2019

(54) METHOD AND APPARATUS FOR SENDING AND DETECTING DISCOVERY REFERENCE SIGNAL

(71) Applicant: Huawei Technologies Co., Ltd., Shenzhen (CN)

(72) Inventors: Lei Guan, Beijing (CN); Lixia Xue, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/784,863

(22) Filed: Oct. 16, 2017

(65) Prior Publication Data

US 2018/0041315 A1 Feb. 8, 2018

Related U.S. Application Data

(63) Continuation of application No. 14/801,165, filed on Jul. 16, 2015, now Pat. No. 9,813,212, which is a
(Continued)

(51) Int. Cl.
*H04L 12/28* (2006.01)
*H04L 5/00* (2006.01)
(Continued)

(52) U.S. Cl.
CPC .......... *H04L 5/005* (2013.01); *H04J 11/0093* (2013.01); *H04L 5/0005* (2013.01);
(Continued)

(58) Field of Classification Search
CPC ............................ H04L 5/0005; H04L 5/0007
See application file for complete search history.

(56) References Cited

U.S. PATENT DOCUMENTS

| 2009/0010179 A1* | 1/2009 | Laroia | H04W 8/005 370/254 |
| 2009/0010244 A1* | 1/2009 | Laroia | H04L 5/0007 370/350 |

(Continued)

FOREIGN PATENT DOCUMENTS

| CN | 102448088 A | 5/2012 |
| EP | 2555439 A1 | 2/2013 |

(Continued)

OTHER PUBLICATIONS

LG Electronics, "Enhancement on Periodic CSI Transmission for Carrier Aggregation," 3GPP TSG RAN WG1 Meeting #68bis, R1-121415, Jeju, Korea, Mar. 26-30, 2012, 4 pages.
(Continued)

*Primary Examiner* — Farah Faroul
(74) *Attorney, Agent, or Firm* — Slater Matsil, LLP

(57) ABSTRACT

A method for detecting a discovery reference signal includes: detecting, by a terminal device, a candidate sequence of a discovery reference signal at a candidate time-frequency resource location of the discovery reference signal to determine an actual time-frequency resource location and an actual sequence of the discovery reference signal, wherein the a candidate sequence includes the actual sequence, and the candidate time-frequency resource location includes the actual time-frequency resource location; determining, by the terminal device, a value of information, and a mapping relationship between the value and the candidate sequence and/or the candidate time-frequency resource location; and determining, by the terminal device, an actual value from the value according to the actual sequence and/or the actual time-frequency resource location, and the mapping relationship.

20 Claims, 3 Drawing Sheets

Related U.S. Application Data continuation of application No. PCT/CN2013/070688, filed on Jan. 18, 2013.

(51) Int. Cl.
    *H04J 11/00*     (2006.01)
    *H04L 27/26*     (2006.01)
    *H04W 52/02*     (2009.01)
    *H04W 52/50*     (2009.01)
    *H04W 52/54*     (2009.01)
    *H04W 52/36*     (2009.01)

(52) U.S. Cl.
    CPC ........ *H04L 5/0094* (2013.01); *H04L 27/2613* (2013.01); *H04L 27/2666* (2013.01); *H04W 52/028* (2013.01); *H04W 52/0258* (2013.01); *H04W 52/50* (2013.01); *H04W 52/54* (2013.01); *H04L 5/0007* (2013.01); *H04W 52/367* (2013.01); *Y02D 70/00* (2018.01); *Y02D 70/1262* (2018.01)

(56) References Cited

U.S. PATENT DOCUMENTS

| | | | |
|---|---|---|---|
| 2009/0013081 A1* | 1/2009 | Laroia | H04W 8/005 709/228 |
| 2010/0323684 A1 | 12/2010 | Cai et al. | |
| 2012/0113794 A1 | 5/2012 | Roman et al. | |
| 2012/0147773 A1 | 6/2012 | Kim et al. | |
| 2012/0195285 A1 | 8/2012 | Ko et al. | |
| 2012/0213109 A1 | 8/2012 | Xu et al. | |
| 2015/0085764 A1* | 3/2015 | Xiong | H04W 76/38 370/329 |
| 2015/0245193 A1* | 8/2015 | Xiong | H04W 4/80 370/328 |
| 2015/0256312 A1* | 9/2015 | Yi | H04W 72/04 370/329 |
| 2015/0358899 A1 | 12/2015 | Ko et al. | |
| 2016/0057604 A1 | 2/2016 | Luo et al. | |
| 2016/0242065 A1 | 8/2016 | Fukuta et al. | |
| 2017/0195028 A1* | 7/2017 | Shimezawa | H04W 24/10 |

FOREIGN PATENT DOCUMENTS

| | | |
|---|---|---|
| WO | 2011120433 A1 | 10/2011 |
| WO | 2012022368 A1 | 2/2012 |
| WO | 2012116031 A1 | 8/2012 |

OTHER PUBLICATIONS

NTT DOCOMO, "Enhanced Cell Identification for Additional Carrier Type," 3GPP TSG RAN WG1 Meeting #68, R1-120398, Dresden, Germany, Feb. 6-10, 2012, 4 pages.

\* cited by examiner

METHOD AND APPARATUS FOR SENDING AND DETECTING DISCOVERY REFERENCE SIGNAL

CROSS-REFERENCE TO RELATED APPLICATIONS

This application is a continuation of U.S. patent application Ser. No. 14/801,165, filed on Jul. 16, 2015, which is a continuation of International Application No. PCT/CN2013/070688, filed on Jan. 18, 2013. All of the afore-mentioned patent applications are hereby incorporated by reference in their entireties.

TECHNICAL FIELD

Embodiments of the present invention relate to communications technologies, and in particular, to a method and an apparatus for sending and detecting a discovery reference signal.

BACKGROUND

In a current long term evolution (LTE) system, by detecting a primary synchronization signal (PSS) and a secondary synchronization signal (SSS) that are sent by a base station (eNB), a user equipment (UE) synchronizes with the eNB and identifies a physical cell, afterwards, reads a system broadcast message sent by the eNB, initiates random access to the eNB, and finally, establishes a radio resource control (RRC) connection with the eNB and performs data communication with the eNB.

Both a UE in an RRC connection state and a UE in an RRC idle state need to measure radio resource management (RRM) by using a cell-specific reference signal (CRS), so as to guarantee mobility performance of the UE, thereby implementing appropriate cell handover, cell selection, or cell reselection. In the current LTE system, a sending period of the PSS, the SSS, the CRS and the like is generally as short as about 5 ms; therefore, even if no UE requires a service, the eNB still sends the foregoing synchronization signals and reference signals with the short sending period. As a result, power efficiency of the eNB is not very high.

An idea of solving the foregoing problem by using a discovery reference signal (Discovery Reference Signal, hereinafter referred to as DRS) is proposed in this industry. Based on the DRS, the base station can be closed for a long time, for example, a power amplifier of the base station can be closed for a long time, relative to the existing 5 ms. The reason why the base station can be closed for a long time is that the DRS, even in a closed state for a long time, needs to be sent, so that the UE discovers and/or measures a cell controlled by the base station, that is, a period of the DRS is longer than that of an existing reference signal such as the CRS, for example, the period is hundreds of milliseconds or even several seconds. Although the idea aiming at the DRS has been introduced in this industry, no specific DRS sending and detecting solution for solving the foregoing problem is provided.

SUMMARY

Embodiments of the present invention provide a method and an apparatus for sending and detecting a discovery reference signal, so as to implement sending and detection of the discovery reference signal.

According to a first aspect, an embodiment of the present invention provides a method for detecting a discovery reference signal. The method includes acquiring, by a user equipment, configuration information of a discovery reference signal, where the configuration information includes time-frequency resource information and sequence information of the discovery reference signal, the time-frequency resource information indicates at least one candidate time-frequency resource location of the discovery reference signal, and the sequence information indicates at least one candidate sequence of the discovery reference signal. The method also includes receiving, by the user equipment, a first discovery reference signal sent by a base station. The method also includes determining, by the user equipment, a candidate time-frequency resource location of the discovery reference signal according to the time-frequency resource information, determining a candidate sequence of the discovery reference signal according to the sequence information, and, by detecting the candidate sequence of the discovery reference signal at the candidate time-frequency resource location, determining an actual time-frequency resource location of the first discovery reference signal and/or determining an actual sequence corresponding to the first discovery reference signal.

In a first possible implementation manner of the first aspect, the determining a candidate time-frequency resource location according to the time-frequency resource information includes: determining a first time-frequency resource location and a second time-frequency resource location, where the first time-frequency resource location and the second time-frequency resource location are incompletely overlapped; the determining a candidate sequence according to the sequence information includes: determining a first sequence and a second sequence; the configuration information further includes a mapping relationship between the candidate time-frequency resource location and the candidate sequence; correspondingly, before detecting the candidate sequence of the discovery reference signal at the candidate time-frequency resource location, the method includes: determining a candidate sequence corresponding to each candidate time-frequency resource location according to the mapping relationship, where the first time-frequency resource location is corresponding to the first sequence, and the second time-frequency resource location is corresponding to the second sequence; and detecting the candidate sequence of the discovery reference signal at the candidate time-frequency resource location includes: detecting the first sequence at the first time-frequency resource location, and detecting the second sequence at the second time-frequency resource location.

According to the first aspect or the first possible implementation manner of the first aspect, in a second possible implementation manner of the first aspect, the time-frequency resource information at least indicates the first time-frequency resource location and the second time-frequency resource location of the discovery reference signal, the minimum interval between resource elements in the first time-frequency resource location is different from the minimum interval between resource elements in the second time-frequency resource location, and/or the resource elements in the first time-frequency resource location are partially overlapped with the resource elements in the second time-frequency resource location, where the resource elements are subcarriers, resource blocks, symbols, subframes, or radio frames.

According to the first aspect or one of the first two possible implementation manners of the first aspect, in a third possible implementation manner of the first aspect, the configuration information further includes first information, and a first mapping relationship between different values of the first information and different time-frequency resource locations and/or different sequences, where the first information includes at least one of the following information: power level information of a cell, carrier type information, duplexing mode information, random access configuration information, and configuration information of a cell-specific reference signal CRS and a channel state information-reference signal CSI-RS; and the method further includes: determining a value of the first information corresponding to the actual time-frequency resource location according to the determined actual time-frequency resource location and the first mapping relationship; and/or determining a value of the first information corresponding to the actual sequence according to the determined actual sequence and the first mapping relationship.

According to the third possible implementation manner of the first aspect, in a fourth possible implementation manner of the first aspect, the power level information includes open/closed information or a sending power value of the cell.

According to the first aspect or one of the first four possible implementation manners of the first aspect, in a fifth possible implementation manner of the first aspect, the configuration information further includes a second mapping relationship between the time-frequency resource location and/or the sequence of the discovery reference signal and cell identification information; and the method further includes: determining, according to the determined actual time-frequency resource location and/or the actual sequence, and the second mapping relationship, the cell identifier information corresponding to the cell controlled by a base station sending the first discovery reference signal.

According to the first aspect or one of the first four possible implementation manners of the first aspect, in a sixth possible implementation manner of the first aspect, the configuration information further includes a third mapping relationship between different values of the first information and second information; the first information includes at least one of the following information: power level information of a cell, carrier type information, duplexing mode information, random access configuration information, and configuration information of a CRS and a CSI-RS; the second information includes one of the following information: a scrambling code and a time-frequency resource location, a scrambling code and a sequence, as well as a scrambling code and a time-frequency resource location and a sequence, where the scrambling code is a scrambling code used by the sequence of the discovery reference signal; and the method further includes: determining, according to the scrambling code used by the sequence of the discovery reference signal, an actual scrambling code used by the actual sequence; and determining a value of the first information corresponding to the actual scrambling code and the actual time-frequency resource location according to the determined actual scrambling code, the actual time-frequency resource location, and the third mapping relationship; or determining a value of the first information corresponding to the actual scrambling code and the actual sequence according to the determined actual scrambling code, the actual sequence, and the third mapping relationship; or determining a value of the first information corresponding to the actual scrambling code, the actual sequence, and the actual time-frequency resource location according to the determined actual scrambling code, the actual sequence, the actual time-frequency resource location, and the third mapping relationship.

According to the first aspect or one of the first six possible implementation manners of the first aspect, in a seventh possible implementation manner of the first aspect, the method further includes: determining a cell in an open state, and determining reference signal received quality of a first cell according to a ratio of received power of the discovery reference signal of the first cell to total received power of the discovery reference signal of the cell in the open state, where the first cell is a cell controlled by the base station sending the first discovery reference signal.

According to the first aspect or one of the first six possible implementation manners of the first aspect, in an eighth possible implementation manner of the first aspect, the method further includes: determining reference signal received quality of a first cell by using a ratio of received power of the discovery reference signal of the first cell to received power of another discovery reference signal, excluding the second discovery reference signal, at a third time-frequency resource location, where the first cell is a cell controlled by the base station sending the first discovery reference signal; the second discovery reference signal includes a discovery reference signal of another cell in a closed state, excluding the first cell, or includes a discovery reference signal of a cell in the closed state; and the third time-frequency resource location includes the actual time-frequency resource location, or includes the time-frequency resource location indicated by the base station, a time-frequency resource location defined by the user equipment, or a pre-defined time-frequency resource location.

According to a second aspect, an embodiment of the present invention provides a method for sending a discovery reference signal. The method includes acquiring, by a network side device, configuration information of a discovery reference signal, where the configuration information includes time-frequency resource information and sequence information of the discovery reference signal, the time-frequency resource information indicates at least one candidate time-frequency resource location of the discovery reference signal, and the sequence information indicates at least one candidate sequence of the discovery reference signal. The method also includes selecting, by the network side device, an actual time-frequency resource location from the candidate time-frequency resource location and selecting an actual sequence from the candidate sequence. The method also includes generating, by the network side device, a first discovery reference signal and sending the first discovery reference signal through the actual time-frequency resource location and the actual sequence.

In a first possible implementation manner of the second aspect, the time-frequency resource information at least indicates a first time-frequency resource location and a second time-frequency resource location of the discovery reference signal, the minimum interval between resource elements in the first time-frequency resource location is different from the minimum interval between resource elements in the second time-frequency resource location, and/or the resource elements in the first time-frequency resource location are partially overlapped with the resource elements in the second time-frequency resource location, where the resource elements are subcarriers, resource blocks, symbols, subframes, or radio frames.

According to the second aspect or the first possible implementation manner of the second aspect, in a second possible implementation manner of the second aspect, the method further includes: determining, by network side device, a value of first information, where the first information includes at least one of the following information: power level information of a cell, carrier type information, duplexing mode information, random access configuration information, and configuration information of a cell-specific reference signal CRS and a cell-specific reference signal CSI-RS, where the selecting, by the network side device, an actual time-frequency resource location from the candidate time-frequency resource location includes: determining the actual time-frequency resource location according to the determined value and a first mapping relationship, where the first mapping relationship includes a mapping relationship between different values of the first information and different time-frequency resource locations; and/or the selecting, by the network side device, an actual sequence from the candidate sequence includes: determining the actual sequence according to the determined value and a second mapping relationship, where the second mapping relationship includes a mapping relationship between different values of the first information and different sequences.

According to the second possible implementation manner of the second aspect, in a third possible implementation manner of the second aspect, the method further includes: determining an actual scrambling code according to the determined value and a third mapping relationship, where the third mapping relationship includes a mapping relationship between different values of the first information and scrambling codes used by different sequences, and the actual scrambling code is a scrambling code used by the actual sequence; and scrambling the actual sequence by using the actual scrambling code.

According to the second or third possible implementation manner of the second aspect, in a fourth possible implementation manner of the second aspect, the power level information includes open/closed information or a sending power value of the cell.

According to a third aspect, an embodiment of the present invention provides an apparatus for detecting a discovery reference signal, where the apparatus for detecting a discovery reference signal is a user equipment. The apparatus includes an acquiring unit, configured to acquire configuration information of a discovery reference signal, where the configuration information includes time-frequency resource information and sequence information of the discovery reference signal, the time-frequency resource information indicates at least one candidate time-frequency resource location of the discovery reference signal, and the sequence information indicates at least one candidate sequence of the discovery reference signal. The apparatus also includes a receiving unit, configured to receive a first discovery reference signal sent by a base station. The apparatus also includes a processing unit, configured to determine a candidate time-frequency resource location of the discovery reference signal according to the time-frequency resource information acquired by the acquiring unit, determine a candidate sequence of the discovery reference signal according to the sequence information acquired by the acquiring unit, and, by detecting the candidate sequence of the discovery reference signal at the candidate time-frequency resource location, determine an actual time-frequency resource location of the first discovery reference signal received by the receiving unit and/or determine an actual sequence corresponding to the first discovery reference signal.

In a first possible implementation manner of the third aspect, the processing unit being configured to determine a candidate time-frequency resource location of the discovery reference signal according to the time-frequency resource information, and determine a candidate sequence of the discovery reference signal according to the sequence information includes: being configured to determine a first time-frequency resource location and a second time-frequency resource location according to the time-frequency resource information, where the first time-frequency resource location and the second time-frequency resource location are incompletely overlapped, and determine a first sequence and a second sequence according to the sequence information; the configuration information further includes a mapping relationship between the candidate time-frequency resource location and the candidate sequence; correspondingly, the processing unit being configured to detect the candidate sequence of the discovery reference signal at the candidate time-frequency resource location includes: being configured to determine a candidate sequence corresponding to each candidate time-frequency resource location according to the mapping relationship, where the first time-frequency resource location is corresponding to the first sequence, and the second time-frequency resource location is corresponding to the second sequence; and detect the first sequence at the first time-frequency resource location, and detect the second sequence at the second time-frequency resource location.

According to the third aspect or the first possible implementation manner of the third aspect, in a second possible implementation manner of the third aspect, the time-frequency resource information at least indicates the first time-frequency resource location and the second time-frequency resource location of the discovery reference signal, the minimum interval between resource elements in the first time-frequency resource location is different from the minimum interval between resource elements in the second time-frequency resource location, and/or the resource elements in the first time-frequency resource location are partially overlapped with the resource elements in the second time-frequency resource location, where the resource elements are subcarriers, resource blocks, symbols, subframes, or radio frames.

According to the third aspect or one of the first two possible implementation manners of the third aspect, in a third possible implementation manner of the third aspect, the configuration information further includes first information, and a first mapping relationship between different values of the first information and different time-frequency resource locations and/or different sequences; the first information includes at least one of the following information: power level information of a cell, carrier type information, duplexing mode information, random access configuration information, and configuration information of a cell-specific reference signal CRS and a channel state information-reference signal CSI-RS; and the processing unit is further configured to: determine a value of the first information corresponding to the actual time-frequency resource location according to the determined actual time-frequency resource location and the first mapping relationship; and/or determine a value of the first information corresponding to the actual sequence according to the determined actual sequence and the first mapping relationship.

According to the third possible implementation manner of the third aspect, in a fourth possible implementation manner of the third aspect, the power level information includes open/closed information or a sending power value of the cell.

According to the third aspect or one of the first four possible implementation manners of the third aspect, in a fifth possible implementation manner of the third aspect, the configuration information further includes a second mapping relationship between the time-frequency resource location and/or the sequence of the discovery reference signal and cell identifier information; and the processing unit is further configured to determine, according to the determined actual time-frequency resource location and/or the actual sequence, and the second mapping relationship, the cell identifier information corresponding to the cell controlled by a base station sending the first discovery reference signal.

According to the third aspect or one of the first four possible implementation manners of the third aspect, in a sixth possible implementation manner of the third aspect, the configuration information further includes a third mapping relationship between different values of the first information and second information, where the first information includes at least one of the following information: power level information of a cell, carrier type information, duplexing mode information, random access configuration information, and configuration information of a CRS and a CSI-RS; the second information includes one of the following information: a scrambling code and a time-frequency resource location, a scrambling code and a sequence, as well as a scrambling code and a time-frequency resource location and a sequence, where scrambling code is a scrambling code used by the sequence of the discovery reference signal; and the processing unit is further configured to: determine, according to the scrambling code used by the sequence of the discovery reference signal, an actual scrambling code used by the actual sequence; and determine a value of the first information corresponding to the actual scrambling code and the actual time-frequency resource location according to the determined actual scrambling code, the actual time-frequency resource location; and the third mapping relationship; or determine a value of the first information corresponding to the actual scrambling code and the actual sequence according to the determined actual scrambling code, the actual sequence, and the third mapping relationship; or determine a value of the first information corresponding to the actual scrambling code, the actual sequence, and the actual time-frequency resource location according to the determined actual scrambling code, the actual sequence, the actual time-frequency resource location, and the third mapping relationship.

According to the third aspect or one of the first six possible implementation manners of the third aspect, in a seventh possible implementation manner of the third aspect, the processing unit is further configured to: determine a cell in an open state, and determine reference signal received quality of a first cell according to a ratio of received power of the discovery reference signal of the first cell to total received power of the discovery reference signal of the cell in the open state, where the first cell is a cell controlled by the base station sending the first discovery reference signal.

According to the third aspect or one of the first six possible implementation manners of the third aspect, in an eighth possible implementation manner of the third aspect, the processing unit is further configured to: determine reference signal received quality of the first cell by using a ratio of received power of the discovery reference signal of the first cell to received power of another discovery reference signal, excluding the second discovery reference signal, at a third time-frequency resource location, where the first cell is a cell controlled by the base station sending the first discovery reference signal; the second discovery reference signal includes a discovery reference signal of another cell in a closed state, excluding the first cell, or includes a discovery reference signal of a cell in the closed state; and the third time-frequency resource location includes the actual time-frequency resource location, or includes a time-frequency resource location indicated by the base station, a time-frequency resource location defined by the user equipment, or a pre-defined time-frequency resource location.

According to a fourth aspect, an embodiment of the present invention provides an apparatus for sending a discovery reference signal, where the apparatus for sending the discovery reference signal is a network side device. The apparatus includes an acquiring unit, configured to acquire configuration information of a discovery reference signal, where the configuration information includes time-frequency resource information and sequence information of the discovery reference signal, the time-frequency resource information indicates at least one candidate time-frequency resource location of the discovery reference signal, and the sequence information indicates at least one candidate sequence of the discovery reference signal. The apparatus also includes a selecting unit, configured to select an actual time-frequency resource location from the candidate time-frequency resource location acquired by the acquiring unit, and select an actual sequence from the candidate sequence acquired by the acquiring unit. The apparatus also includes a generating unit, configured to generate a first discovery reference signal. The apparatus also includes a sending unit, configured to send, through the actual time-frequency resource location and the actual sequence that are selected by the selecting unit, the first discovery reference signal generated by the generating unit.

In a first possible implementation manner of the fourth aspect, the time-frequency resource information at least indicates a first time-frequency resource location and a second time-frequency resource location of the discovery reference signal, the minimum interval between resource elements in the first time-frequency resource location is different from the minimum interval between resource elements in the second time-frequency resource location, and/or the resource elements in the first time-frequency resource location are partially overlapped with the resource elements in the second time-frequency resource location, where the resource elements are subcarriers, resource blocks, symbols, subframes, or radio frames.

According to the fourth aspect or the first possible implementation manner of the fourth aspect, in a second possible implementation manner of the fourth aspect, the apparatus further includes a determining unit, configured to determine a value of the first information, where the first information includes at least one of the following information: power level information of a cell, carrier type information, duplexing mode information, random access configuration information, and configuration information of a cell-specific reference signal CRS and a cell-specific reference signal CSI-RS, where the selecting unit is specifically configured to: determine the actual time-frequency resource location according to the value determined by the determining unit and a first mapping relationship, where the first mapping relationship includes a mapping relationship between different values of the first information and different time-frequency resource locations; and/or determine the actual sequence according to the determined value and a second mapping relationship, where the first mapping relationship includes a mapping relationship between different values of the first information and different sequences.

According to the second possible implementation manner of the fourth aspect, in a third possible implementation manner of the fourth aspect, the selecting unit is further configured to: determine an actual scrambling code according to the value determined by the determining unit and a third mapping relationship, where the third mapping relationship includes a mapping relationship between different values of the first information and scrambling codes used by different sequences, and the actual scrambling code is a scrambling code used by the actual sequence; and the apparatus further includes a scrambling unit, configured to scramble the actual sequence by using the actual scrambling code.

According to the second or third possible implementation manner of the fourth aspect, in a fourth possible implementation manner of the fourth aspect, the power level information includes open/closed information or a sending power value of the cell.

In the method and the apparatus for sending and detecting a discovery reference signal according to the embodiments of the present invention, sending of the discovery reference signal can be implemented, and discovery reference signal of each cell can be detected by acquiring the time-frequency resource information and the sequence information in the configuration information of the discovery reference signal.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
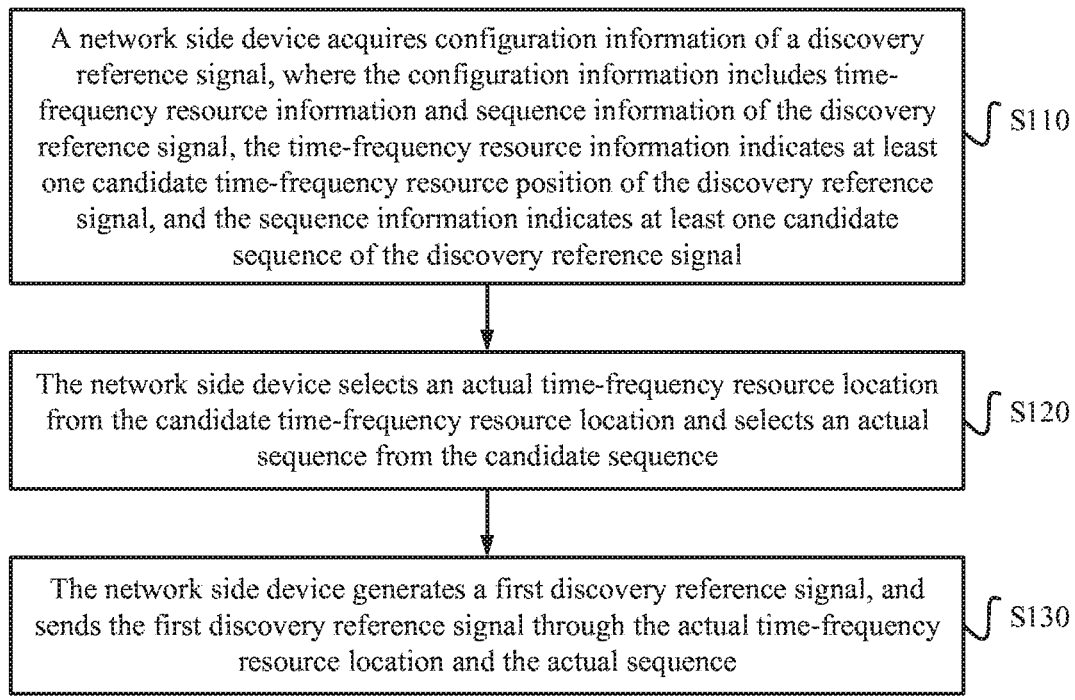
FIG. 1 is a flowchart of a method for sending a discovery reference signal according to a first embodiment of the invention.

FIG. 1 is a flowchart of a method for sending a discovery reference signal according to a first embodiment of the present invention. As shown in FIG. 1, the method for sending a discovery reference signal in this embodiment is executed by an apparatus for sending a discovery reference signal configured in a network side device, where the method may include the following steps.

S110: The network side device acquires configuration information of a discovery reference signal, where the configuration information includes time-frequency resource information and sequence information of the discovery reference signal, the time-frequency resource information indicates at least one candidate time-frequency resource location of the discovery reference signal, and the sequence information indicates at least one candidate sequence of the discovery reference signal.

To be specific, the network side device may be a base station, and the base station may acquire configuration information of a DRS in a pre-configured manner, where the configuration information of the DRS includes time-frequency resource information of the DRS and sequence information of the DRS. The time-frequency resource information may indicate a plurality of candidate time-frequency resource locations of the DRS, and the sequence information may indicate a plurality of candidate sequences of the DRS, where the plurality of candidate time-frequency resource locations of the DRS may be frames, subframes, timeslots or symbols in a time domain, and frequency bands, resource blocks, resource elements and the like in a frequency domain; and the plurality of candidate sequences of the DRS may apply a pseudorandom sequence like a Gold sequence, or apply a Zadoff-Chu sequence like a CAZAC sequence. The embodiment of the present invention does not limit a sequence form of the DRS.

S120: The network side device selects an actual time-frequency resource location from the candidate time-frequency resource location and selects an actual sequence from the candidate sequence, that is, the network side device may select the actual time-frequency resource location and the actual sequence that are needed.

S130: The network side device generates a first discovery reference signal, and sends the first discovery reference signal through the actual time-frequency resource location and the actual sequence. In other words, the network side device generates the first discovery reference signal that needs to be sent, and sends the first discovery reference signal in the selected actual time-frequency resource location and on the selected actual sequence.

Generally, a sending period of the DRS is long, for example, the sending period is 500 ms, then the user equipment does not need to detect the DRS in each subframe. For a user equipment in an RRC connection state, a base station may configure a detection time point of a DRS of a neighboring cell for the user equipment by using RRC signaling, for example, the DRS is detected at a time point when a value of the time point mode 500 is 0, that is, from a start time point, the DRS is detected once every 500 frames, and during each detection, the DRS may be detected according to the foregoing time-frequency resource location, such as a subframe, a timeslot, or a symbol, and a frequency band, a resource block, or a resource element, and the like; for a user equipment in an RRC idle state, the base station may notify the user equipment of a detection time point of the DRS of the current serving cell and/or the neighboring cell by using cell broadcast signaling, or in a pre-defined manner, for example, in a case where frame numbers of cells are synchronous, the sending time point of the DRS of each cell may be a time point when a value of the time point mode 500 is 0, and the sending period is fixed, like 500 ms, a time point and a period for the user equipment to detect the DRS of each cell may be pre-defined to be synchronous with the sending time point and the sending period of the DRS of each cell. The embodiment of the present invention does not limit manners for sending and configuring the configuration information of the DRS, and a manner for configuring the time point and/or period for detecting the DRS is not limited thereto.

In the method for sending a DRS according to this embodiment, the base station sends the DRS by using an actual time-frequency resource and an actual sequence selected from candidate time-frequency resource information and candidate sequence information that are indicated in the configuration information of the DRS, so that the user equipment can detect the DRS of each cell.

Further, the time-frequency resource information at least indicates a first time-frequency resource location and a second time-frequency resource location of the discovery reference signal, the minimum interval between resource elements in the first time-frequency resource location is different from the minimum interval between resource elements in the second time-frequency resource location, and/or the resource elements in the first time-frequency resource location are partially overlapped with the resource elements in the second time-frequency resource location, where the resource elements are subcarriers, resource blocks, symbols, subframes, or radio frames. That is, the resource elements occupied by a plurality of time-frequency resource locations may apply a partially overlapped division manner, such as the following implementation manner A and implementation manner B.

Implementation manner A: the first time-frequency resource location occupies resource elements 0 and 1 on an orthogonal frequency division multiplexing (OFDM) symbol in a physical resource block, the second time-frequency resource location occupies resource elements 0 and 2 on the OFDM symbol in the physical resource block, and a third time-frequency resource location occupies resource elements 1 and 2 on the OFDM symbol in the physical resource block.

Implementation manner B: the first time-frequency resource location occupies OFDM symbols 0 and 1 in a subframe, the second time-frequency resource location occupies OFDM symbols 0 and 2 in the subframe, and the third time-frequency resource location occupies OFDM symbols 1 and 2 in the subframe.

The partially overlapped division manner of the resource elements occupied by the plurality of time-frequency resource locations may also adopt a combination of the implementation manner A and the implementation manner B, that is, different time-frequency resource locations adopt the partially overlapped division manner on both the symbols in the subframe and the resource elements on the symbols, and the embodiment of the present invention is not limited to the partially overlapped division manner.

Through partial overlap of resources of different DRSs, the partially overlapped division manner of the resources units occupied by the plurality of time-frequency resource locations may increase a multiplex ratio of time-frequency resources of the DRS, and avoid complete overlap of the plurality of time-frequency resource locations, thereby implementing interference randomization during a detection progress of the DRS, and improving measurement accuracy of radio resource management by using a design of partially overlapped resources in a scene with open and closed cells.

Further, the method includes: determining, by the network side device, a value of first information, where the first information includes at least one of the following information: power level information of a cell, carrier type information, duplexing mode information, random access configuration information, and configuration information of a cell-specific reference signal CRS and a channel state information-reference signal (CSI-RS) of the cell-specific reference signal; and the selecting, by the network side device, an actual time-frequency resource location from the candidate time-frequency resource location includes: determining, by the network side device, an actual time-frequency resource location according to the determined value and a first mapping relationship, where the first mapping relationship includes a mapping relationship between different values of the first information and different time-frequency resource locations; and/or the selecting, by the network side device, an actual sequence from the candidate sequence includes: determining, by the network side device, an actual sequence according to the determined value and a second mapping relationship, where the second mapping relationship includes a mapping relationship between different values of the first information and different sequences.

Further, the method includes: determining an actual scrambling code according to the determined value and a third mapping relationship, where the third mapping relationship includes a mapping relationship between different values of the first information and scrambling codes used by different sequences, and the actual scrambling code is a scrambling code used by an actual sequence; and scrambling the actual sequence by using the actual scrambling code.

Further, the power level information includes open/closed information or a sending power value of the cell.

To be specific, the carrier type information may indicate that the carriers are backward compatible carriers and non-backward compatible new carriers; the duplexing mode information may include frequency division duplexing (FDD) and time division duplexing (TDD); the random access configuration information includes preamble sequence information and/or time-frequency resource information of a physical random access channel, where the preamble sequence information may include a root sequence index, a cyclic prefix and the like; the configuration information of the CRS and the CSI-RS includes a plurality of time-frequency resource configurations of the CRS and the CSI-RS, and may also be a combination of resource configurations of the CRS and the CSI-RS; information indicating whether the cell can be triggered and opened by signaling sent by the UE represents that after acquiring the information, the UE may determine whether the cell corresponding to the current configuration information can be triggered and opened by a signal sent by the UE, so as to close or adjust sending power of the cell. Therefore, the same cell may also be corresponding to different configuration information, and the different configuration information may carry some other information of the cell.

The power level information may include open/closed information or a sending power value of the cell. Specifically, zero power information and non-zero power information may be used to respectively represent that the cell is in a closed state and the cell is in an open state; the sending power value may be expressed by using a plurality of power levels, such as high, medium, and low, or a specific power numerical value, such as 10 W, 5 W, 1 W, or 0 W, or other similar power-related states and power values.

The power level information may be carried by at least one of a sequence of the DRS, a scrambling code corresponding to the sequence, time-frequency resource location information, a combination relationship between the time-frequency resource information and the sequence information, and the like. For example, the sequence is used to carry open/closed information, assuming that both DRS sequence 1 and DRS sequence 2 are corresponding to the current cell at the same time, if the UE detects DRS sequence 1, it may be considered that the current cell is in an open state, and the UE may receive other configuration information of the current cell, such as broadcast information, so as to reside in the current cell or to perform normal data transmission on the current cell; if the UE detects DRS sequence 2, it may be considered that the current cell is in a closed state, and the UE may not select the current cell for residing or accessing, instead, the UE may try to reside in or access another open cell; or the UE may also send signaling to trigger the current cell to be opened, for example, an uplink sending sequence corresponding to DRS sequence 2 sent by the current cell is used for triggering; or if the user equipment discovers, by detecting open/closed information of the cell carried in the DRS of a currently resided or accessed cell, that the currently accessed cell has turned from an open state to a closed state, the user equipment may start a reselection process or a handover process of the cell, or the user equipment may trigger measurement of a neighboring cell and reside in or access the neighboring cell, so as to implement reselection, handover and the like of the cell as soon as possible. In this way, by detecting the DRS to discover open/closed or power level of the currently detected cell by using the UE, information of the currently detected cell can be acquired quickly, and further, the corresponding mobility procedure can be performed, for example, timely cell reselection, handover or the like, and mobility performance of the UE is improved.

Correspondingly, when the base station turns the current cell from the open state to the closed state by adjusting the DRS configuration information, the base station will delay a time interval before closing the current cell, and other current state changes can be processed in a similar way. In this way, during this time interval, the UE that resides in or accesses the base station may be guaranteed to have enough time to perform timely cell reselection or handover so as not to suffer decrease of the mobility performance caused by sudden close or power reduction of the base station, for example, the UE does not have enough time to be reselected to a proper cell for residence or to be handed over to the proper cell. Specifically, if the base station does not give such a time interval before closing, the UE is very likely to miss detection of a paging message during the reselection or handover process, thereby leading to experience decrease of the UE.

The user equipment may also obtain a path loss value from the user equipment to the base station by detecting the sending power value carried in the DRS sent by the base station. Specifically, the user equipment may obtain the path loss value according to a difference value between the sending power value carried in the DRS and a received power value of the DRS. The UE may also report the path loss value to the base station, so that the base station adjusts sending power for sending the DRS to the user equipment. In this way, sending power of the UE and the base station can be optimized, so that the UE sends information by using proper power without causing large uplink interference to surroundings, and also the base station can send information to the UE by using proper power without causing large downlink interference to the surroundings.

Further, the configuration information includes a mapping relationship between the discovery reference signal and cell identifier information, so that the user equipment determines the cell identifier information corresponding to the currently detected cell according to a detected discovery reference signal and the mapping relationship.

One type of configuration information of the DRS may be corresponding to one physical cell identifier, specifically, the time-frequency resource location and/or the sequence of the DRS may be corresponding to the physical cell identifier. For example, if 504 physical cells need to be distinguished, one way is to use 504 DRS sequences to respectively correspond to 504 physical cell identifiers; another way is to combine two time-frequency resource locations of the DRS with 252 DRS sequences at each of the time-frequency resource locations, so as to respectively correspond to 504 physical cell identifiers; and another way is to combine two main DRS sequences with 252 auxiliary DRS sequences, so as to respectively correspond to 504 physical cell identifiers. The DRS in the embodiment of the present invention may include a plurality of time-frequency resource locations and a plurality of sequences. Therefore, more than 504 physical cells can be identified, and a manner for identifying the physical cells is not limited thereto.

Multiple types of configuration information of the DRS may be corresponding to one physical cell identifier, specifically, the time-frequency resource location and/or the sequence of the DRS may be corresponding to the physical cell identifier. For example, two DRS sequences may be used to correspond to one physical cell identifier; or two scrambling manners of one DRS sequence may be used to correspond to one physical cell identifier; or DRS sequences arranged in different manners may be used to correspond to one physical cell identifier; or different time-frequency resource locations may be used to correspond to one physical cell identifier, and the like. In a case where multiple types of configuration information of the DRS are corresponding to one physical cell identifier, that two types of configuration information of the DRS are corresponding to one physical cell identifier is used as an example, and the two types of configuration information of the DRS may be respectively used for identifying information, such as open/closed information and a sending power value, of the base station of the current physical cell.

Further, the configuration information includes a combination relationship between the time-frequency resource information and the sequence information.

In the foregoing solution, the so-called combination relationship between the time-frequency resource information and the sequence information may also constitute a factor corresponding to specific content, that is, not only different sequences are used to correspond to different contents, but also combination of the time-frequency resource information and the sequence information is set to correspond to different contents, for example, the same sequence corresponding to different time-frequency resource locations may correspond to different cell identifiers.

Specifically, if the time-frequency resource information of the DRS only includes one time-frequency resource location, the combination relationship may be: DRS sequences of all cells are mapped to the resource location, that is, one resource location is combined with different DRS sequences; if the time-frequency resource information of the DRS includes time-frequency resource locations of more than one types, a time-frequency resource location of a first type may be combined with a first DRS sequence, and a time-frequency resource location of a second type may be combined with a second DRS sequence, where the time-frequency resource location of the first type and the time-frequency resource location of the second type are different from each other, but the first DRS sequence and the second DRS sequence may be either the same or different.

Further, the sequence information includes a scrambling code corresponding to the sequence. To be specific, the sequence information of the DRS may also include a plurality of scrambling codes of the DRS sequence, where the scrambling code may implement scrambling processing of the DRS sequence, the scrambling processing may apply an XOR manner or other manners, and the scrambling code may be generated by using a cell identifier as a parameter. Different scrambling manners of one sequence may also correspond to different information contents.

Further, the time-frequency resource information includes one time-frequency resource location, and the time-frequency resource location is a set radio frame label, a subframe label, a symbol label, a subcarrier label, or a resource block label. In other words, a location of the DRS in a radio frame or a subframe may be fixed, such as a fixed frame, subframe, timeslot or OFDM symbol; and a frequency domain location may also be fixed, such as a fixed resource element on a fixed physical resource block. That one subframe is occupied when the DRS is sent once is used an example, the DRS may occupy fixed locations in the subframe, such as fixed resource elements on the first, third, fifth, and seventh OFDM symbols of the subframe; and that two subframes are occupied when the DRS is sent once is used as an example, the DRS may occupy fixed locations in the two subframes, for example, the DRS respectively occupies fixed resource elements on the first and second OFDM symbols of the first subframe, and fixed resource elements on the third and fourth OFDM symbols of the second subframe. The embodiment of the present invention does not limit a location specifically set by the time-frequency resource location.

If the time-frequency resource information of the DRS includes time-frequency resource locations of two or more than two types, the DRS corresponding to the plurality of time-frequency resource locations may correspond to either a plurality of cells or the same cell. The plurality of time-frequency resource locations may be a combination of a plurality of resource elements on one OFDM symbol, for example, the first time-frequency resource location is an odd resource element on an OFDM symbol in a physical resource block, and a second time-frequency resource location is an even resource element on the OFDM symbol in the physical resource block.

In the method for sending a discovery reference signal according to the embodiment of the present invention, the DRS may be sent according to the time-frequency resource information and the sequence information in the configuration information of the DRS; the user equipment may be enabled to determine cell identifier information corresponding to the currently detected cell by using the detected mapping relationship between the DRS and the cell identifier information; the user equipment may be enabled to measure reference signal received quality of the currently detected cell by using the detected DRS; and the user equipment may also be enabled to more accurately obtain a measurement result of reference signal received quality of the currently detected cell by using the power level information carried in the detected DRS.

Figure 2:
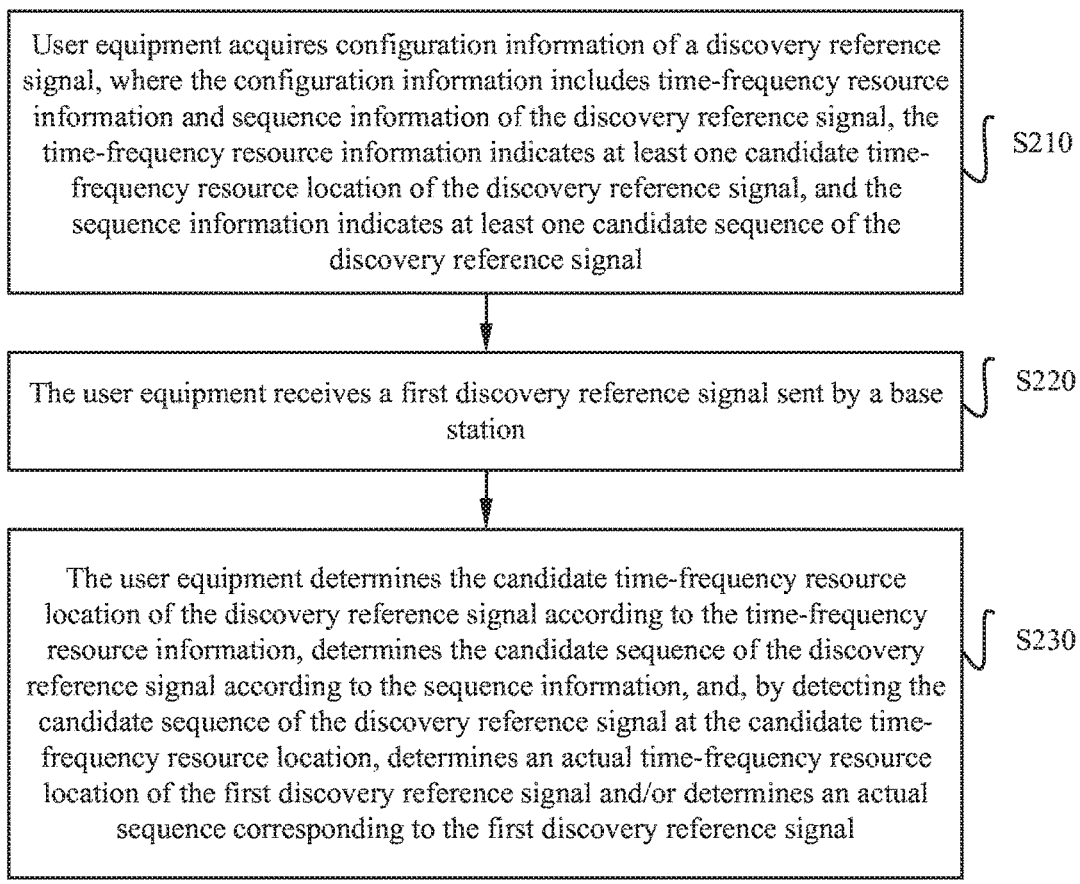
FIG. 2 is a flowchart of a method for detecting a discovery reference signal according to another embodiment of the invention.

FIG. 2 is a flowchart of a method for detecting a discovery reference signal according to a second embodiment of the present invention. As shown in FIG. 2, the method for detecting a discovery reference signal in this embodiment is executed by an apparatus for detecting a discovery reference signal configured in a user equipment. The method may include the following steps.

S210: A user equipment acquires configuration information of a discovery reference signal, where the configuration information includes time-frequency resource information and sequence information of the discovery reference signal, the time-frequency resource information indicates at least one candidate time-frequency resource location of the discovery reference signal, and the sequence information indicates at least one candidate sequence of the discovery reference signal.

The user equipment, such as a mobile phone or a tablet computer, may acquire the configuration information of the DRS in a pre-configured manner, or acquire the configuration information from a base station by using RRC signaling, cell broadcast signaling, or a handover command. Various types of DRSs may be provided, and different DRSs may correspond to different configuration information. The configuration information of the DRS includes time-frequency resource information of the DRS and sequence information of the DRS. Therefore, the configuration information may also be understood as a sending parameter of the DRS, such as a sequence and time-frequency resource information used to send the DRS. The time-frequency resource information of the DRS may be used for indicating one or more types of candidate time-frequency resource locations of the DRS; the candidate time-frequency resource location may represent at least one of a frame, a subframe, a timeslot, and a symbol in a time domain, and at least one of a frequency band, a resource block, and a resource element in a frequency domain, and the like; the sequence information of the DRS may be used for indicating at least one candidate sequence of the DRS, the candidate sequence of the DRS may apply a pseudorandom sequence like a Gold sequence, or a Zadoff-Chu sequence like a CAZAC sequence. The embodiment of the present invention does not limit a sequence form of the DRS.

S220: The user equipment receives a first discovery reference signal sent by a base station.

Generally, a sending period of the DRS is long, for example, the sending period is 500 ms, then the user equipment does not need to detect the DRS in each subframe. For a user equipment in an RRC connection state, a detection time point of a DRS of a current serving cell or a neighboring cell may be configured for the user equipment by using RRC signaling, for example, the DRS is detected at a time point when a value of the time point mode 500 is 0, that is, from a start time point, the DRS is detected once every 500 frames, and during each detection, the DRS may be detected according to the foregoing time-frequency resource location, such as a subframe, a timeslot, or a symbol, and a frequency band, a resource block, or a resource elements, and the like; for a user equipment in an RRC idle state, the user equipment may be notified of the detection time point of the DRS of the current serving cell and/or the neighboring cell by using cell broadcast signaling, or in a pre-defined manner, for example, in a case where frame numbers of cells are synchronous, the sending time point of the DRS of each cell may be a time point when a value of the time point mode 500 is 0, and the sending period is fixed, like 500 ms, a time point and a period for the user equipment to detect the DRS of each cell may be pre-defined to be synchronous with the sending time point and the sending period of the DRS of each cell. The embodiment of the present invention does not limit manners for sending and configuring the configuration information of the DRS, and a manner for configuring the detection time point and/or period of the DRS is not limited thereto.

S230. The user equipment determines a candidate time-frequency resource location of the discovery reference signal according to the time-frequency resource information, determines a candidate sequence of the discovery reference signal according to the sequence information, and, by detecting the candidate sequence of the discovery reference signal at the candidate time-frequency resource location, determines an actual time-frequency resource location of a first discovery reference signal and/or determines an actual sequence corresponding to the first discovery reference signal.

The user equipment may detect the DRS through the time-frequency resource locations included in the time-frequency resource information and a sequence included in the sequence information that are obtained from the configuration information of the DRS. The DRS includes the time-frequency resource location information and the sequence information; therefore, it can be determined that the DRS is detected after the time-frequency resource location and the sequence are determined.

The actual time-frequency resource location of the first discovery reference signal may be fixed, namely, known. Therefore, by detecting the sequence of the discovery reference signal at the time-frequency resource location, only the actual sequence needs to be determined. Situations where only the actual time-frequency resource location is determined are similar, and no details are given herein any further. Certainly, the actual time-frequency resource location and the actual sequence may also be determined by detecting the sequence of the discovery reference signal at the time-frequency resource location.

A cell identifier corresponding to the DRS may be determined after the DRS is detected, for example, different sequences may correspond to different cell identifiers.

In the method for detecting the DRS according to this embodiment, the user equipment may detect the DRS of each cell by acquiring the time-frequency resource information and the sequence information in the configuration information of the DRS.

Further, the determining a candidate time-frequency resource location according to the time-frequency resource information includes: determining a first time-frequency resource location and a second time-frequency resource location, where the first time-frequency resource location and the second time-frequency resource location are incompletely overlapped; the determining a candidate sequence according to the sequence information includes: determining a first sequence and a second sequence, where the first sequence and the second sequence may be either the same or different; the configuration information further includes a mapping relationship between the candidate time-frequency resource location and the candidate sequence; correspondingly, before the detecting the candidate sequence of the discovery reference signal at the candidate time-frequency resource location, the method includes: determining a candidate sequence corresponding to each candidate time-frequency resource location according to the mapping relationship, where the first time-frequency resource location is corresponding to the first sequence, the second time-frequency resource location is corresponding to the second sequence; and the detecting the candidate sequence of the discovery reference signal at the candidate time-frequency resource location includes: detecting the first sequence at the first time-frequency resource location, and detecting the second sequence at the second time-frequency resource location.

Further, the configuration information includes a combination relationship between the time-frequency resource information and the sequence information; correspondingly, the detecting the discovery reference signal according to the configuration information includes: detecting the discovery reference signal according to the time-frequency resource information, the sequence information, and the combination relationship.

In the foregoing solution, the so-called combination relationship between the time-frequency resource information and the sequence information may also constitute a factor corresponding to specific content, that is, not only different sequences are used to correspond to different contents, but also combination of the time-frequency resource information and the sequence information is set to correspond to different contents, for example, the same sequence corresponding to different time-frequency resource locations may correspond to different cell identifiers. For example, for a same sequence, a first time-frequency resource location, at which the sequence is located, is corresponding to one cell identifier, and a second time-frequency resource location, at which the sequence is located, is corresponding to another cell identifier.

Specifically, if the time-frequency resource information of the DRS only includes a time-frequency resource location of one type, the combination relationship may be: DRS sequences of all cells are mapped to the resource location, that is, one resource location is combined with different DRS sequences; if the time-frequency resource information of the DRS includes time-frequency resource locations of more than one types, a time-frequency resource location of a first type may be combined with a first DRS sequence, and a time-frequency resource location of a second type may be combined with a second DRS sequence, where the time-frequency resource location of the first type and the time-frequency resource location of the second type are different from each other, but the first DRS sequence and the second DRS sequence may be either the same or different.

Further, the sequence information includes a scrambling code corresponding to the sequence. To be specific, the sequence information of the DRS may also include a plurality of scrambling codes of the DRS sequence, where the scrambling code may implement scrambling processing of the DRS sequence, the scrambling processing may apply an XOR manner or other manners, and the scrambling code may be generated by using a cell identifier as a parameter. Different scrambling manners of one sequence may also correspond to different information contents, such as, different cell identifiers or other information.

Further, the time-frequency resource information includes one time-frequency resource location, and the time-frequency resource location is a set radio frame label, a subframe label, a symbol label, a subcarrier label, or a resource block label. In other words, a location of the DRS in a radio frame or a subframe may be fixed, such as a fixed frame, subframe, timeslot or OFDM symbol; and a frequency domain location may also be fixed, such as a fixed resource element on a fixed physical resource block. That one subframe is occupied when the DRS is sent once is used as an example, the DRS may occupy fixed locations in the subframe, such as fixed resource elements on the first, third, fifth, and seventh OFDM symbols of the subframe; and that two subframes are occupied when the DRS is sent once is used as an example, the DRS may occupy fixed locations in the two subframes, for example, the DRS respectively occupies fixed resource elements on the first and second OFDM symbols of the first subframe, and fixed resource elements on the third and fourth OFDM symbols of the second subframe. The embodiment of the present invention does not limit a location specifically set by the time-frequency resource location.

If the time-frequency resource information of the DRS includes time-frequency resource locations of two or more than two types, the DRS corresponding to the plurality of time-frequency resource locations may correspond to either a plurality of cells or the same cell. Specifically, one embodiment is as follows: DRS sequence 1 sent at the first time-frequency resource location is corresponding to cell identifier 1, and DRS sequence 1 sent at the second time-frequency resource location is corresponding to cell identifier 2; another embodiment is as follows: DRS sequence 1 sent at the first time-frequency resource location is corresponding to power level 1 of a cell with cell identifier 1, and DRS sequence 1 sent at the second time-frequency resource location is corresponding to power level 2 of a cell with cell identifier 1; and the like. The plurality of time-frequency resource locations may be a combination of a plurality of resource elements on one OFDM symbol, for example, the first time-frequency resource location is an odd resource element on an OFDM symbol in a physical resource block, and a second time-frequency resource location is an even resource element on the OFDM symbol in the physical resource block.

Further, the time-frequency resource information at least indicates a first time-frequency resource location and a second time-frequency resource location of the discovery reference signal, the minimum interval between resource elements in the first time-frequency resource location is different from the minimum interval between resource elements in the second time-frequency resource location, and/or the resource elements in the first time-frequency resource location are partially overlapped with the resource elements in the second time-frequency resource location, where the resource elements are subcarriers, resource blocks, symbols, subframes, or radio frames. That is, the resource elements occupied by a plurality of time-frequency resource locations may apply a partially overlapped division manner, such as the following implementation manner A and an implementation manner B.

Implementation manner A: a first time-frequency resource location occupies resource elements 0 and 1 on an OFDM symbol in a physical resource block, a second time-frequency resource location occupies resource elements 0 and 2 on the OFDM symbol in the physical resource block, and a third time-frequency resource location occupies resource elements 1 and 2 on the OFDM symbol in the physical resource block.

Implementation manner B: the first time-frequency resource location occupies OFDM symbols 0 and 1 in a subframe, the second time-frequency resource location occupies OFDM symbols 0 and 2 in the subframe, and the third time-frequency resource location occupies OFDM symbols 1 and 2 in the subframe.

The partially overlapped division manner of the resource elements occupied by the plurality of time-frequency resource locations may also adopt a combination of the implementation manner A and the implementation manner B, that is, different time-frequency resource locations adopt the partially overlapped division manner on both the symbols in the subframe and the resource elements on the symbols, and the embodiment of the present invention is not limited to the partially overlapped division manner.

Through partial overlap of resources of different DRSs, the partially overlapped division manner of the resources units occupied by the plurality of time-frequency resource locations may increase a multiplex ratio of time-frequency resources of the DRS, and avoid complete overlap of the plurality of time-frequency resource locations, thereby implementing interference randomization during a detection progress of the DRS, and improving measurement accuracy of radio resource management by using a design of partially overlapped resources in a scene with open and closed cells.

Further, the configuration information includes first information, and a first mapping relationship between different values of the first information and different time-frequency resource locations and/or different sequences, where the first information includes at least one of the following information: power level information of a cell, carrier type information, duplexing mode information, random access configuration information, and configuration information of a cell-specific reference signal CRS and a channel state information-reference signal CSI-RS; the method further includes: determining a value of the first information corresponding to the actual time-frequency resource location according to the determined actual time-frequency resource location and the first mapping relationship, and/or determining a value of the first information corresponding to the actual sequence according to the determined actual sequence and the first mapping relationship.

Different values of the first information may be different power levels, different carrier types, different duplexing modes, different random access configuration information, or CRS/CSI-RS configuration information. The first mapping relationship may be pre-defined in the user equipment, or configured by the network side device for the user equipment. The carrier type information may indicate that the carriers are backward compatible carriers and non-backward compatible new carriers; the duplexing mode information may include FDD and TDD; the random access configuration information includes preamble sequence information and/or time-frequency resource information of a physical random access channel, where the preamble sequence information may include a root sequence index, a cyclic prefix and the like; the configuration information of the CRS and the CSI-RS includes a plurality of time-frequency resource configurations of the CRS and the CSI-RS, and may also be a combination of the resource configurations of the CRS and the CSI-RS; information indicating whether the cell can be triggered and opened by signaling sent by the UE represents that after acquiring the information, the UE may determine whether the cell corresponding to the current configuration information can be triggered and opened by a signal sent by the UE, so as to close or adjust sending power of the cell. Therefore, the same cell may be corresponding to different configuration information, and the different configuration information may carry some other information of the cell.

Further, the power level information includes open/closed information or a sending power value of the cell.

Further, the configuration information includes a third mapping relationship between different values of the first information and the second information, where the first information includes at least one of the following information: power level information of a cell, carrier type information, duplexing mode information, random access configuration information, and configuration information of the CRS and the CSI-RS; the second information includes one of the following information: a scrambling code and a time-frequency resource location, a scrambling code and a sequence, as well as a scrambling code and a time-frequency resource location and a sequence, where the scrambling code is a scrambling code used by the sequence of the discovery reference signal; the method further includes: determining, according to the scrambling code used by the sequence of the discovery reference signal, an actual scrambling code used by the actual sequence; and determining a value of the first information corresponding to the actual scrambling code and the actual time-frequency resource location according to the determined actual scrambling code, the actual time-frequency resource location, and the third mapping relationship, or determining a value of the first information corresponding to the actual scrambling code and the actual sequence according to the determined actual scrambling code, the actual sequence, and the third mapping relationship, or determining a value of the first information corresponding to the actual scrambling code, the actual sequence, and the actual time-frequency resource location according to the determined actual scrambling code, the actual sequence, the actual time-frequency resource location, and the third mapping relationship.

The power level information may include open/closed information or a sending power value of the cell. Specifically, zero power information and non-zero power information may be used to respectively represent that the cell is in a closed state and the cell is in an open state; the sending power value may be expressed by using a plurality of power levels, such as high, medium, and low, or a specific power numerical value, such as 10 W, 5 W, 1 W, or 0 W, or other similar power-related states and power values.

The power level information may be carried by at least one of a sequence of the DRS, a scrambling code corresponding to the sequence, time-frequency resource location information, a combination relationship between the time-frequency resource information and the sequence information, and the like, for example, the sequence is used to carry open/closed information, assuming that both DRS sequence 1 and DRS sequence 2 are corresponding to the current cell at the same time, if the UE detects DRS sequence 1, it may be considered that the current cell is in an open state, and the UE may receive other configuration information of the current cell, such as broadcast information, so as to reside in the current cell or to perform normal data transmission on the current cell; if the UE detects DRS sequence 2, it may be considered that the current cell is in a closed state, and then the UE may not select the current cell for residing or accessing, instead, the UE may try to reside in or access another open cell; or the UE may also send signaling to trigger the current cell to be opened, for example, an uplink sending sequence corresponding to DRS sequence 2 sent by the current cell is used for triggering; or if the user equipment discovers, by detecting open/closed information of the cell carried in the DRS of a currently resided or accessed cell, that the currently accessed cell has turned from an open state to a closed state, the user equipment may start a reselection process or a handover process of the cell, or the user equipment may trigger measurement of a neighboring cell and reside in or access the neighboring cell, so as to implement reselection, handover and the like of the cell as soon as possible. In this way, by detecting the DRS to discover open/closed or power level of the currently detected cell by using the UE, information of the currently detected cell can be acquired quickly, and further, the corresponding mobility procedure can be performed, for example, timely cell reselection, handover or the like, and mobility performance of the UE is improved.

The user equipment may also obtain a path loss value from the user equipment to the base station by detecting the sending power value carried in the DRS sent by the base station. Specifically, the user equipment may obtain the path loss value according to a difference value between the sending power value carried in the DRS and a received power value of the DRS. The UE may also report the path loss value to the base station, so that the base station adjusts sending power for sending the DRS to the user equipment. In this way, sending power of the UE and the base station can be optimized, so that the UE sends information by using proper power without causing large uplink interference to surroundings, and also the base station can send information to the UE by using proper power without causing large downlink interference to the surroundings.

Further, the configuration information includes a second mapping relationship between the time-frequency resource location and/or the sequence of the discovery reference signal and the cell identifier information; the method further includes: determining, according to the determined actual time-frequency resource location and/or the actual sequence, and the second mapping relationship, the cell identifier information corresponding to the cell controlled by the base station sending the first discovery reference signal.

One type of configuration information of the DRS may be corresponding to one physical cell identifier, specifically, the time-frequency resource location and/or the sequence of the DRS may be corresponding to the physical cell identifier. For example, if 504 physical cells need to be distinguished, one way is to use 504 DRS sequences to respectively correspond to 504 physical cell identifiers; another way is to combine two time-frequency resource locations of the DRS with 252 DRS sequences at each of the time-frequency resource locations, so as to respectively correspond to 504 physical cell identifiers; and another way is to combine two main DRS sequences with 252 auxiliary DRS sequences, so as to respectively correspond to 504 physical cell identifiers. The DRS in the embodiment of the present invention may include a plurality of time-frequency resource locations and a plurality of sequences. Therefore, more than 504 physical cells can be identified, and a manner for identifying the physical cells is not limited thereto.

Multiple types of configuration information of the DRS may be corresponding to one physical cell identifier, specifically, the time-frequency resource location and/or the sequence of the DRS may be corresponding to the physical cell identifier. For example, two DRS sequences may be used to correspond to one physical cell identifier; or two scrambling manners of one DRS sequence may be used to correspond to one physical cell identifier; or DRS sequences arranged in different manners may be used to correspond to one physical cell identifier; or DRS at different time-frequency resource locations may be used to correspond to one physical cell identifier, and the like. In a case where multiple types of configuration information of the DRS are corresponding to one physical cell identifier, that two types of configuration information of the DRS are corresponding to one physical cell identifier is used as an example, and the two types of configuration information of the DRS may be respectively used for identifying information, such as open/closed information and a sending power value, of the base station of the current physical cell.

Further, the method includes: determining a cell in an open state, and determining reference signal received quality of a first cell according to a ratio of received power of the discovery reference signal of the first cell to total received power of the discovery reference signal of the cell in the open state, where the first cell is a cell controlled by the base station sending the first discovery reference signal.

Further, the method includes: determining reference signal received quality of a first cell according to a ratio of received power of the discovery reference signal of the first cell to received power of other discovery reference signal, excluding the second discovery reference signal, at a third time-frequency resource location, where the first cell is a cell controlled by the base station sending the first discovery reference signal; the second discovery reference signal includes a discovery reference signal of another cell in a closed state, excluding the first cell, or includes a discovery reference signal of a cell in the closed state; the third time-frequency resource location includes the actual time-frequency resource location, or includes the time-frequency resource location indicated by the base station, a time-frequency resource location defined by the user equipment, or a pre-defined time-frequency resource location.

Further, the sending power of the DRS is inconsistent with the sending power of downlink data of the current cell or other reference signals; therefore, a power ratio or a power offset value may be pre-defined or configured for the UE, so that the UE obtains a sending power situation of uplink and downlink data of the current cell according to a sending power ratio of the DRS to the downlink data or a power offset value of the DRS and the downlink data, thereby finally obtaining an accurate RRM measurement value.

To be specific, a measurement of received quality of the DRS of the currently detected cell belongs to RRM measurement. RRM measurement may include measurement of one or more of reference signal received power (RSRP), received signal strength indicator (RSSI), and reference signal received quality (RSRQ).

Using RSRQ measurement as an example, the RSRQ may be a ratio of the RSRP to the RSSI, where the RSRP is received power of the DRS of the current cell; the RSSI is received power of all signals on the resource element at which the DRS of the current cell is located, that is, the RSSI includes a sum of the received power of the DRS of the current cell and all interference and noise power.

In a heterogeneous network, lots of micro cells or pico cells (Pico cell) are generally deployed within a scope of a macro cell, where the macro cell mainly provides coverage and real-time data service for the user equipment; the micro cells mainly provide a high-rate data service for the user equipment; a micro cell base station may be closed when no service needs to be provided for any user equipment, and the closed micro cell base station will still send the DRS at a long period. Actually, the micro cell base station in a closed state has no interference on other cells; therefore, a finally obtained RSRQ value is underestimated if the RSSI includes DRS received power of the micro cell base station in the closed state.

To solve the foregoing problem of underestimation of the RSRQ value, the following methods may be adopted.

Method 1: firstly, determine a cell in an open state, specifically, according to power level information of the cell, for example, a first DRS sequence represents that a base station of a cell identified by the first DRS sequence is in an open state, a second DRS sequence represents that a base station of a cell identified by the second DRS sequence is in a closed state, and then the user equipment may identify the cell in the open state by using the first sequence; determine the RSRP as received power of the discovery reference signal of the current cell; and determine the RSSI as total received power of the discovery reference signal of all cells in the open state on a time-frequency resource at which the DRS of the current cell is located, where the RSRQ is a ratio of the RSRP to the RSSI, and an RSRQ value obtained in this way is more accurate.

Method 2: firstly, determine a cell in a closed state, specifically, according to power level information of the cell, for example, a first DRS sequence represents that a base station of a cell identified by the first DRS sequence is in an open state, a second DRS sequence represents that a base station of a cell identified by the second DRS sequence is in a closed state, then the user equipment may identify the cell in the closed state by using the second sequence; determine the RSRP as received power of the discovery reference signal of the current cell; and determine the RSSI as received power of a discovery reference signal, excluding a first discovery reference signal, at the current time-frequency resource location, where the current time-frequency resource location includes a time-frequency resource location which bears the discovery reference signal of the current cell, or the current time-frequency resource location is a time-frequency resource location indicated by a base station, a time-frequency resource location defined by the UE, or a pre-defined time-frequency resource location. Specifically, the base station may indicate, for the UE by using RRC specific signaling or broadcast signaling, the time-frequency resource location used to measure the RSSI, where the time-frequency resource location is either a pre-defined time-frequency resource location (for example, a pre-defined subframe or a radio frame) or a time-frequency resource location defined by the UE; the time-frequency resource location may include the discovery reference signal of the current cell, or not include the discovery reference signal of the current cell or any cell, for example, the time-frequency resource location selects not to include a frequency location of the DRS, and the like; the first discovery reference signal includes a discovery reference signal of another cell in the closed state, excluding the current cell, or includes a discovery reference signal of a cell in the closed state; the RSRQ is a ratio of the RSRP to the RSSI, and a value of the RSRQ obtained in this way is more accurate.

In other words, method 2 may include the following steps: firstly, determining the cell in an open state, specifically, according to power level information of the cell, for example, a first DRS sequence represents that a base station of a cell identified by the first DRS sequence is in an open state, a second DRS sequence represents that a base station of a cell identified by the second DRS sequence is in a closed state, then the user equipment may identify the cell in the open state by using the first sequence; determining the RSRP as received power of the discovery reference signal of the current cell; and determining the RSSI as a sum of received power of the discovery reference signals of the current cell and other cells in the open state at the current time-frequency resource location, or determining that the RSSI further includes power of signals, excluding the DRS, at the current time-frequency resource location, where the current time-frequency resource location includes a time-frequency resource location which bears the discovery reference signal of the current cell; the RSRQ is a ratio of the RSRP to the RSSI, and a value of the RSRQ obtained in this way is more accurate.

Method 3: calculate the RSSI without eliminating power of the closed cell, instead, average the RSSI or the RSRQ at first time interval Q according to information of the closed cell, that is, determine the final RSRQ by dividing a ratio of the RSRP to the RSSI by first time interval Q, where the length of first time interval Q may be greater than the length of a time interval of the currently detected DRS, for example, if the DRS sent by the base station at a time is located in two subframes, first time interval Q may be a length of a radio frame, that is, a length of 10 subframes, or may be of different time interval length values. Specifically, first time interval Q may be pre-defined, or configured for the UE by the base station, or determined by the UE according to detected information of a closed cell, such as the number and/or power of the closed cells.

In the method for detecting a discovery reference signal according to the embodiment of the present invention, the DRS of each cell may be detected according to time-frequency resource information and sequence information in the configuration information of the DRS, the cell identifier information corresponding to the currently detected cell may be determined by using the detected mapping relationship between the DRS and the cell identifier information, received quality of the reference signal of the currently detected cell may also be measured by using the detected DRS, and a measurement result of received quality of the reference signal of the currently detected cell may be obtained more accurately by using the power level information carried in the detected DRS.

Figure 3:
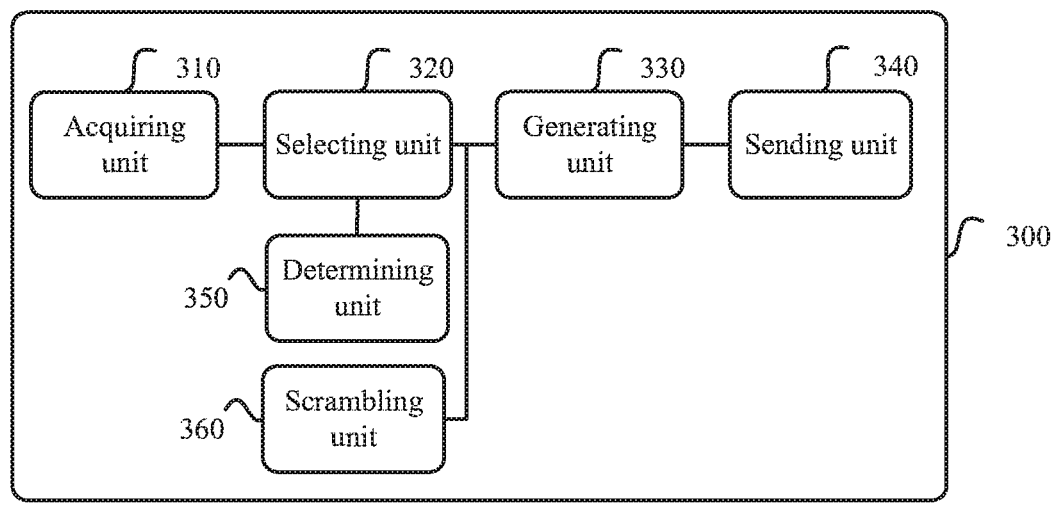
FIG. 3 is a schematic structural diagram of an apparatus for sending a discovery reference signal according to an embodiment of the invention.

FIG. 3 is a schematic structural diagram of an apparatus for sending a discovery reference signal according to embodiments of the present invention. As shown in FIG. 3, the apparatus 300 for sending the discovery reference signal according to this embodiment may be set on a network side device, and may also be the network side device itself, and may include an acquiring unit 310, a selecting unit 320, a generating unit 330, a sending unit 340, a determining unit 350, and a scrambling unit 360.

The acquiring unit 310 is configured to acquire configuration information of the discovery reference signal, where the configuration information includes time-frequency resource information and sequence information of the discovery reference signal, the time-frequency resource information indicates at least one candidate time-frequency resource location of the discovery reference signal, and the sequence information indicates at least one candidate sequence of the discovery reference signal.

The selecting unit 320 is configured to select an actual time-frequency resource location from the candidate time-frequency resource location acquired by the acquiring unit 310, and select an actual sequence from the candidate sequence acquired by the acquiring unit 310. The generating unit 330 is configured to generate a first discovery reference signal. The sending unit 340 is configured to send, through the actual time-frequency resource location and the actual sequence that are selected by the selecting unit 320, the first discovery reference signal generated by the generating unit 330.

Further, the time-frequency resource information at least indicates a first time-frequency resource location and a second time-frequency resource location of the discovery reference signal, the minimum interval between resource elements in the first time-frequency resource location is different from the minimum interval between resource elements in the second time-frequency resource location, and/or the resource elements in the first time-frequency resource location are partially overlapped with the resource elements in the second time-frequency resource location, where the resource elements are subcarriers, resource blocks, symbols, subframes, or radio frames;

Further, the determining unit 350 is configured to determine a value of first information, where the first information includes at least one of the following information: power level information of a cell, carrier type information, duplexing mode information, random access configuration information, and configuration information of a cell-specific reference signal CRS and a cell-specific reference signal CSI-RS; and the selecting unit 320 is specifically configured to: determine an actual time-frequency resource location according to the value determined by the determining unit 350 and a first mapping relationship, where the first mapping relationship includes a mapping relationship between different values of the first information and different time-frequency resource locations, and/or determine an actual sequence according to the determined value and a second mapping relationship, where the second mapping relationship includes a mapping relationship between different values of the first information and different sequences.

Further, the selecting unit 320 is configured to determine an actual scrambling code according to the value determined by the determining unit 350 and a third mapping relationship, where the third mapping relationship includes a mapping relationship between different values of the first information and scrambling codes used by different sequences, and the actual scrambling code is a scrambling code used by the actual sequence; and the scrambling unit 360 is configured to scramble the actual sequence by using the actual scrambling code.

Further, the power level information includes open/closed information or a sending power value of a cell.

The apparatus for sending a discovery reference signal according to the embodiment of the present invention may be configured to implement the technical solution in as the method embodiment shown in FIG. 1 by using a device of each functional unit, may send DRS according to the time-frequency resource information and the sequence information in the configuration information of the DRS; may enable a user equipment to determine cell identifier information corresponding to a currently detected cell by using a detected mapping relationship between the DRS and the cell identifier information; may enable the user equipment to measure received quality of the reference signal of the currently detected cell by using the detected DRS; and may also enable the user equipment to more accurately obtain a measurement result of the received quality of the reference signal of the currently detected cell by using the power level information carried in the detected DRS. Further, the sending power of the DRS is inconsistent with the sending power of downlink data of the current cell or other reference signals; therefore, a power ratio or a power offset value may be pre-defined or configured for the UE, so that the UE may obtain sending power situation of uplink and downlink data of the current cell according to a sending power ratio of the DRS to the downlink data or a power offset value of the DRS and the downlink data, thereby finally obtaining an accurate RRM measurement value.

Figure 4:
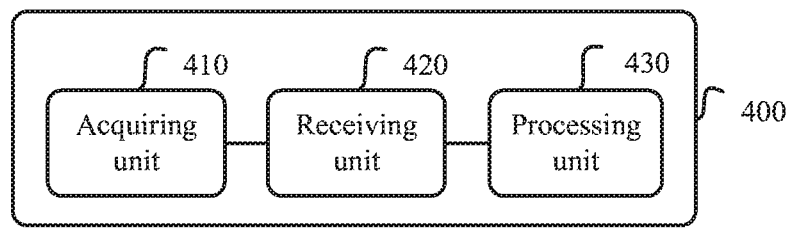
FIG. 4 is a schematic structural diagram of an apparatus for detecting a discovery reference signal according to an embodiment of the invention.

FIG. 4 is a schematic structural diagram of an apparatus for detecting a discovery reference signal according to another embodiment of the present invention. As shown in FIG. 4, the apparatus 400 for detecting a discovery reference signal according to this embodiment may be set on a user equipment, may also be the user equipment itself, and may include an acquiring unit 410, a receiving unit 420, and a processing unit 430.

The acquiring unit 410 is configured to acquire configuration information of a discovery reference signal, where the configuration information includes time-frequency resource information and sequence information of the discovery reference signal, the time-frequency resource information indicates at least one candidate time-frequency resource location of the discovery reference signal, and the sequence information indicates at least one candidate sequence of the discovery reference signal.

The receiving unit 420 is configured to receive a first discovery reference signal sent by a base station. The processing unit 430 is configured to determine a candidate time-frequency resource location of the discovery reference signal according to the time-frequency resource information acquired by the acquiring unit 410, determine a candidate sequence of the discovery reference signal according to the sequence information acquired by the acquiring unit 410, and, by detecting the candidate sequence of the discovery reference signal at the candidate time-frequency resource location, determine an actual time-frequency resource location of the first discovery reference signal received by the receiving unit 420 and/or determine an actual sequence corresponding to the first discovery reference signal.

Further, the processing unit 430 being configured to determine a candidate time-frequency resource location of the discovery reference signal according to the time-frequency resource information, and determine a candidate sequence of the discovery reference signal according to the sequence information includes: being configured to determine a first time-frequency resource location and a second time-frequency resource location according to the time-frequency resource information, where the first time-frequency resource location and the second time-frequency resource location are incompletely overlapped, and determine a first sequence and a second sequence according to the sequence information; the configuration information further includes a mapping relationship between the candidate time-frequency resource location and the candidate sequence; correspondingly, the processing unit 430 being configured to detect the candidate sequence of the discovery reference signal at the candidate time-frequency resource location includes: being configured to determine a candidate sequence corresponding to each candidate time-frequency resource location according to the mapping relationship, where the first time-frequency resource location is corresponding to the first sequence, the second time-frequency resource location is corresponding to the second sequence; and detect the first sequence at the first time-frequency resource location, and detect the second sequence at the second time-frequency resource location.

Further, the time-frequency resource information at least indicates the first time-frequency resource location and the second time-frequency resource location of the discovery reference signal, the minimum interval between resource elements in the first time-frequency resource location is different from the minimum interval between resource elements in the second time-frequency resource location, and/or the resource elements in the first time-frequency resource location are partially overlapped with the resource elements in the second time-frequency resource location, where the resource elements are subcarriers, resource blocks, symbols, subframes, or radio frames.

Further, the configuration information includes first information, and a first mapping relationship between different values of the first information and different time-frequency resource locations and/or different sequences, where the first information includes at least one of the following information: power level information of a cell, carrier type information, duplexing mode information, random access configuration information, and configuration information of a cell-specific reference signal CRS and a channel state information-reference signal CSI-RS; and the processing unit 430 is further configured to: determine a value of the first information corresponding to the actual time-frequency resource location according to the determined actual time-frequency resource location and the first mapping relationship, and/or determine a value of the first information corresponding to the actual sequence according to the determined actual sequence and the first mapping relationship.

Further, the power level information includes open/closed information or a sending power value of a cell.

Further, the configuration information includes a second mapping relationship between the time-frequency resource location and/or the sequence of the discovery reference signal and cell identifier information; and the processing unit 430 is further configured to determine, according to the determined actual time-frequency resource location and/or the actual sequence, and the second mapping relationship, the cell identifier information corresponding to the cell controlled by a base station sending the first discovery reference signal.

Further, the configuration information includes a third mapping relationship between different values of the first information and second information, where the first information includes at least one of the following information: power level information of a cell, carrier type information, duplexing mode information, random access configuration information, and configuration information of a CRS and a CSI-RS; the second information includes one of the following information: a scrambling code and a time-frequency resource location, a scrambling code and a sequence, as well as a scrambling code and a time-frequency resource location and a sequence; the scrambling code is a scrambling code used by the sequence of the discovery reference signal; the processing unit 430 is further configured to: determine, according to the scrambling code used by the sequence of the discovery reference signal, an actual scrambling code used by the actual sequence, and determine a value of the first information corresponding to the actual scrambling code and the actual time-frequency resource location according to the determined actual scrambling code, the actual time-frequency resource location, and the third mapping relationship, or determine a value of the first information corresponding to the actual scrambling code and the actual sequence according to the determined actual scrambling code, the actual sequence, and the third mapping relationship, or determine a value of the first information corresponding to the actual scrambling code, the actual sequence, and the actual time-frequency resource location according to the determined actual scrambling code, the actual sequence, the actual time-frequency resource location, and the third mapping relationship.

Further, the processing unit 430 is configured to: determine a cell in an open state, and determine reference signal received quality of a first cell according to a ratio of received power of the discovery reference signal of the first cell to total received power of the discovery reference signal of the cell in the open state, where the first cell is a cell controlled by the base station sending the first discovery reference signal.

Further, the processing unit 430 is configured to: determine reference signal received quality of a first cell according to a ratio of received power of the discovery reference signal of the first cell to received power of another discovery reference signal, excluding the second discovery reference signal, at a third time-frequency resource location, where the first cell is a cell controlled by the base station sending the first discovery reference signal; the second discovery reference signal includes a discovery reference signal of another cell in a closed state, excluding the first cell, or includes a discovery reference signal of a cell in the closed state; the third time-frequency resource location includes the actual time-frequency resource location, or includes the time-frequency resource location indicated by the base station, a time-frequency resource location defined by the user equipment, or a pre-defined time-frequency resource location.

The apparatus for detecting a discovery reference signal according to the embodiment of the present invention may be configured to implement a technical solution recorded in the method embodiment shown in FIG. 2 through setting of functional units, may detect the DRS of each cell according to the time-frequency resource information and the sequence information in the configuration information of the DRS, may determine the cell identifier information corresponding to the currently detected cell by using the detected mapping relationship between the DRS and the cell identifier information, may measure received quality of the reference signal of the currently detected cell by using the detected DRS, and may also more accurately obtain a measurement result of received quality of the reference signal of the currently detected cell by using the power level information carried in the detected DRS.

In conclusion, in the method and the apparatus for sending and detecting a discovery reference signal according to the embodiments of the present invention, the DRS of each cell may be sent or detected according to the time-frequency resource information and the sequence information in the configuration information of the DRS, the cell identifier information corresponding to the currently detected cell may be determined by using the detected mapping relationship between the DRS and the cell identifier information, received quality of the reference signal of the currently detected cell may be measured by using the detected DRS, and a measurement result of received quality of the reference signal of the currently detected cell may also be obtained more accurately by using the power level information carried in the detected DRS.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage mediums include various mediums capable of storing program code, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all the technical features thereof, as long as such modifications or replacements do not cause the essence of corresponding technical solutions to depart from the scope of the technical solutions of the embodiments of the present invention.

What is claimed is:

1. A method, comprising:
   detecting, by a terminal device, a candidate sequence of a discovery reference signal at a candidate time-frequency resource location of the discovery reference signal to determine an actual time-frequency resource location and an actual sequence of the discovery reference signal, wherein the candidate sequence includes the actual sequence, and the candidate time-frequency resource location includes the actual time-frequency resource location;
   determining, by the terminal device, a value of information, and a mapping relationship between the value and the candidate sequence or the candidate time-frequency resource location; and
   determining, by the terminal device, an actual value from the value according to the actual sequence, or the actual time-frequency resource location, and the mapping relationship.

2. The method according to claim 1, wherein the information comprises:
   power level information of a cell, carrier type information, duplexing mode information, random access configuration information, or configuration information of a cell-specific reference signal (CRS) and a channel state information-reference signal (CSI-RS).

3. The method according to claim 2, wherein the random access configuration information comprises preamble sequence information or time-frequency resource information of a physical random access channel, or both; or
   wherein the configuration information of the CSI-RS comprises a time-frequency resource of the CSI-RS.

4. The method according to claim 1, wherein determining the mapping relationship comprises: obtaining, by the terminal device, the mapping relationship from a network device.

5. The method according to claim 1, wherein the candidate time-frequency resource location comprises a frame, a subframe, a timeslot or a symbol in a time domain; or
   wherein the candidate time-frequency resource location comprises a frequency band, a resource block, or a resource element in a frequency domain.

6. The method according to claim 1, further comprising:
   obtaining, by the terminal device, a time domain location of the candidate time-frequency resource location through receiving a broadcast signal or a radio resource control (RRC) signal from a network device.

7. The method according to claim 1, wherein the discovery reference signal is for cell discovery or cell measurement.

8. A method, comprising:
   determining, by a network device, an actual sequence and an actual time-frequency resource location of a discovery reference signal, wherein the actual sequence is included in a candidate sequence of the discovery reference signal, and the actual time-frequency resource location is included in a candidate time-frequency resource location of the discovery reference signal;
   sending, by the network device, the discovery reference signal using the actual sequence at the actual time-frequency resource location; and
   sending, by the network device, a value of information, and a mapping relationship between the value and the candidate sequence or the candidate time-frequency resource location.

9. The method according to claim 8, wherein the information comprises:
   power level information of a cell, carrier type information, duplexing mode information, random access configuration information, or configuration information of a cell-specific reference signal (CRS) and a channel state information-reference signal (CSI-RS).

10. The method according to claim 9, wherein the random access configuration information comprises preamble sequence information, or time-frequency resource information of a physical random access channel, or both; or
wherein the configuration information of the CSI-RS comprises a time-frequency resource of the CSI-RS.

11. An apparatus comprising:
a processor; and
a non-transitory memory coupled with the processor, wherein the memory stores instructions, and when the processor executes the instructions, the instructions cause the apparatus to:
detect a candidate sequence of a discovery reference signal at a candidate time-frequency resource location of the discovery reference signal to determine an actual time-frequency resource location and an actual sequence of the discovery reference signal, wherein the candidate sequence includes the actual sequence, and the candidate time-frequency resource location includes the actual time-frequency resource location;
determine a value of information, and a mapping relationship between the value and the candidate sequence or the candidate time-frequency resource location; and
determine an actual value from the value according to the actual sequence, or the actual time-frequency resource location, and the mapping relationship.

12. The apparatus according to claim 11, wherein the information comprises:
power level information of a cell, carrier type information, duplexing mode information, random access configuration information, or configuration information of a cell-specific reference signal (CRS) and a channel state information-reference signal (CSI-RS).

13. The apparatus according to claim 12, wherein the random access configuration information comprises preamble sequence information, or time-frequency resource information of a physical random access channel, or both; or
wherein the configuration information of the CSI-RS comprises a time-frequency resource of the CSI-RS.

14. The apparatus according to claim 11, further comprising:
a receiver, configured to receive the mapping relationship from a network device.

15. The apparatus according to claim 11, wherein the candidate time-frequency resource location comprises a frame, a subframe, a timeslot or a symbol in a time domain; or
wherein the candidate time-frequency resource location comprises a frequency band, a resource block, or a resource element in a frequency domain.

16. The apparatus according to claim 11, wherein the processor is further configured to obtain a time domain location of the candidate time-frequency resource location through receiving a broadcast signal or a radio resource control (RRC) signal from a network device.

17. The apparatus according to claim 11, wherein the discovery reference signal is for cell discovery or cell measurement.

18. A network device, comprising:
a processor; and
a non-transitory memory coupled with the processor, wherein the memory stores instructions, and when the processor executes the instructions, the instructions cause the network device to:
determine an actual sequence and an actual time-frequency resource location of a discovery reference signal, wherein the actual sequence is included in a candidate sequence of the discovery reference signal, and the actual time-frequency resource location is included in a candidate time-frequency resource location of the discovery reference signal;
send the discovery reference signal using the actual sequence at the actual time-frequency resource location; and
send a value of information, and a mapping relationship between the value and the candidate sequence or the candidate time-frequency resource location.

19. The network device according to claim 18, wherein the information comprises:
power level information of a cell, carrier type information, duplexing mode information, random access configuration information, or configuration information of a cell-specific reference signal (CRS) and a channel state information-reference signal (CSI-RS).

20. The network device according to claim 19, wherein the random access configuration information comprises preamble sequence information or time-frequency resource information of a physical random access channel; or
wherein the configuration information of the CSI-RS comprises a time-frequency resource of the CSI-RS.

* * * * *